United States Patent [19]
Couture et al.

[11] Patent Number: 5,912,201
[45] Date of Patent: Jun. 15, 1999

[54] SELF SINTERING CERAMIC COMPOSITION, ARTICLES AND PROCESS

[75] Inventors: Clifford E. Couture; Paul A. Schumacher, both of St. Francis; Orville C. Clemmons, Sussex, all of Wis.

[73] Assignee: Fiber Ceramics, Inc., Cudahy, Wis.

[21] Appl. No.: 08/899,904

[22] Filed: Jul. 24, 1997

Related U.S. Application Data

[62] Division of application No. 08/745,783, Nov. 8, 1996, Pat. No. 5,691,259.

[51] Int. Cl.$^6$ .............................. C04B 35/80; C04B 35/82
[52] U.S. Cl. ........................ 501/95.1; 501/106; 501/107; 501/127; 501/128
[58] Field of Search ................................... 501/95.1, 106, 501/107, 127, 128

[56] References Cited

U.S. PATENT DOCUMENTS

| | | |
|---|---|---|
| 3,090,094 | 5/1963 | Schwartzwalder et al. . |
| 3,097,930 | 7/1963 | Holland . |
| 3,629,116 | 12/1971 | Gartner et al. ............................ 501/95 |
| 4,014,704 | 3/1977 | Miller ...................................... 501/95.1 |
| 4,177,066 | 12/1979 | Clumpner . |
| 4,469,161 | 9/1984 | Higginbotham et al. . |
| 4,545,568 | 10/1985 | Roothfuss et al. ...................... 501/95.1 |
| 4,708,326 | 11/1987 | Brockmeyer et al. . |
| 4,868,142 | 9/1989 | Waisala et al. ......................... 501/95.1 |
| 4,869,468 | 9/1989 | Johnson .................................. 501/95.1 |
| 4,950,627 | 8/1990 | Tokarz et al. ........................... 501/95.1 |
| 4,951,852 | 8/1990 | Rancoulle ............................... 501/95.1 |
| 4,989,664 | 2/1991 | Roth ........................................ 501/95.1 |
| 5,155,070 | 10/1992 | Skorupa ................................... 501/95.1 |

*Primary Examiner*—Karl Group
*Attorney, Agent, or Firm*—Ryan Kromholz & Manion

[57] ABSTRACT

A shaped ceramic article capable of being cut manually into selected sizes and process is based on a mixture of high-temperature resistant ceramic fibers and fibers which soften at temperatures below 2000° F., particles of a ceramic material stable to temperatures exceeding 2000° F., particles of a ceramic material which sinter at temperatures below 2000° F., and a binder which provides green strength to shapes formed by vacuum formation from a slurry. The vacuum formed shape is dried at about 400° F., thereby dried to form a shape which is preferably dipped in colloidal alumina or silica and dried again. The shape is sinterable by contact with flowing molten metal or by being sujected to radiant heat to form a hardened shape-stable ceramic form.

5 Claims, 1 Drawing Sheet

SELF SINTERING CERAMIC COMPOSITION, ARTICLES AND PROCESS

This is a divisional of application Ser. No. 08/745,783 filed on Nov. 8, 1996, now U.S. Pat. No. 5,691,259.

BACKGROUND OF THE INVENTION:

The present invention relates to compositions and gating system components for metal casting and processes for use in casting of molten metals in a foundry setting. More particularly, the invention relates to such compositions and articles which are self sintering when brought in contact with molten metals or otherwise heated.

Heretofore, various components of gating systems used in metal foundry molds have been formed out of extruded and subsequently high temperature fired ceramic materials to produce a system of sleeves, cups, funnels, downsprues and runners for forming a gating system for conveying of molten metals which are introduced into a mold, which itself is often formed of a sand-based material. Risers are also connected to the mold to ensure adequate quantity of molten metal to fill the mold as it contracts upon cooling. Due to the fact that the ceramic sleeves used are formed from fired ceramics, they are dense and heavy and must be cut with a diamond blade wet saw or a special cut-off saw in order to customize the length and shape thereof to be adapted to a particular casting. See, for example, U.S. Pat. Nos. 4,177,066 and 4,469,161. Another disadvantage of such materials is that they tend to act as a heat sink, thus tending to cool the molten metal to some degree. Also, since the parts are formed by extrusion, only simple tubular shapes, without special contours or variations in diameter, are obtainable, unless such parts are machined.

In other foundry applications a fibrous ceramic material may be used, for example, as a sleeve, cup or funnel. Such materials are generally held together with a resin binder, for example, a phenolic resin which will, at molten metal temperatures, be burned away, thereby resulting in disintegration of the fibrous ceramic shape. A need has existed for tubular ceramic materials which would be economical, easy to shape, for example, by cutting by means of a hand tool but yet which would withstand the elevated temperatures necessary to allow flow of molten metal through a gating system into a mold cavity.

SUMMARY OF THE INVENTION

It is a principal object of the present invention to provide a new composition of matter which can be formed, by vacuum formation of a shaped article from an aqueous slurry which is then cured at a relatively moderate temperature, in the 400° Fahrenheit range, into a shape which can readily be worked with. Another object of the invention is to provide shapes formed from such compositions which, upon use in a mold gating system, in which they are contacted by molten metals, become sintered in situ. Additionally, the invention relates to a process of utilizing such compositions to form gating systems, which upon sintering in place, form high-temperature resistant materials.

In accordance with a related aspect of the invention, the shapes formed from the compositions of this invention can be readily cut, for example, with a hand saw or similar manually-operated blade. In accordance with a further aspect of the invention, the compositions of this invention do not shrink appreciably. In accordance with a still further related aspect, the compositions of this invention do not contain appreciable amounts of organic binders and thus do not, upon sintering, emit unwanted amounts of gaseous waste materials.

In accordance with a still further aspect of the invention the shapes are sintered upon a relatively brief period of exposure to molten metals or radiant heat. In accordance with a related aspect, the shapes after sintering resist erosion caused by the flow or formation of any currents within the molten metals. In accordance with a still further aspect of the invention, the shapes upon sintering are dimensionally stable and are resistant to compressive forces.

Briefly, a shaped ceramic article capable of being cut manually into selected sizes and process is based on a mixture of high-temperature resistant ceramic fibers and fibers which soften at temperatures below 2000° F., particles of a ceramic material stable to temperatures exceeding 2000° F., particles of a ceramic material which sinter at temperatures below 2000° F., and a binder which provides green strength to shapes formed by vacuum formation from a slurry. The vacuum formed shape is dried at about 400° F., and thereby dried to form a shape which is preferably subsequently dipped in colloidal alumina or silica and dried again. The shape is sinterable by contact with flowing molten metal into a hardened shape-stable ceramic form.

Further objects and advantages of the invention will become apparent from the accompanying claims, detailed description and drawings.

DETAILED DESCRIPTION

Figure 1:
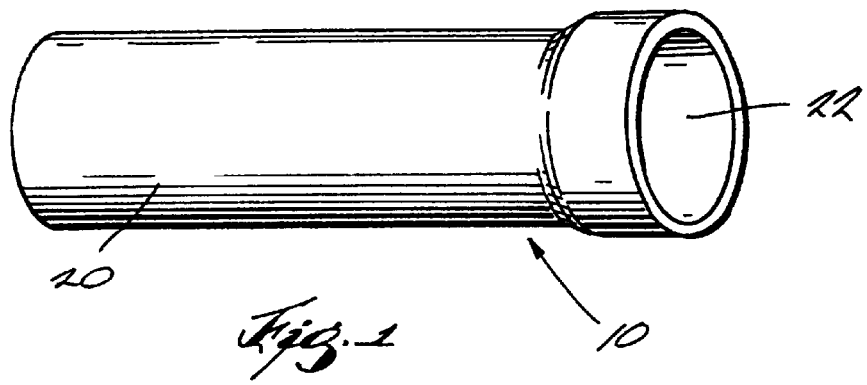
FIG. 1 is a perspective view of a typical ceramic article provided and used in accordance with the invention; and, FIG. 2 is a sectional view through a mold showing the use of the invention.

Referring more particularly to the drawings there is seen a typical ceramic shape 10 in FIG. 1. Article 10 is a dried but unsintered ceramic shape in accordance with the invention.

Figure 2:
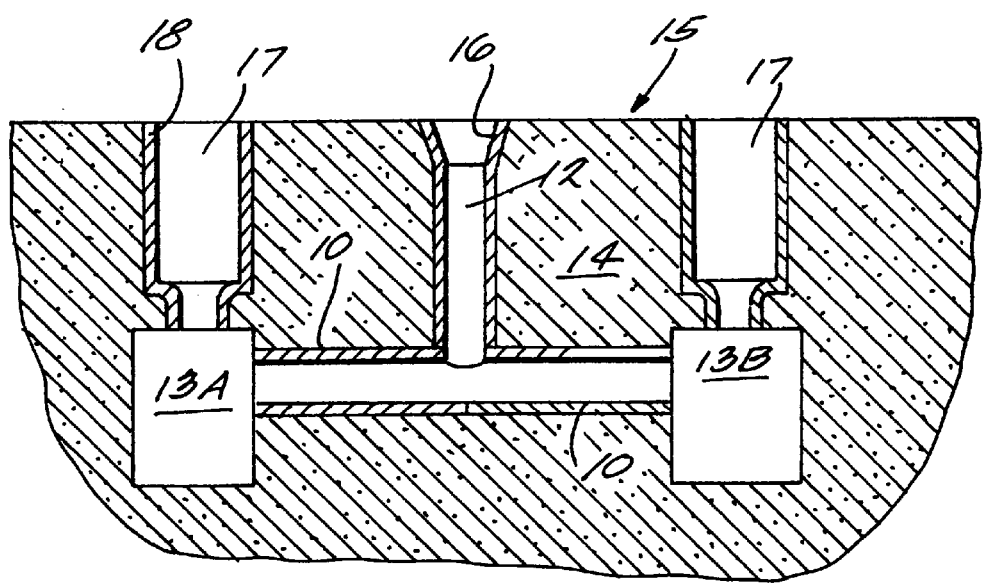

Referring to FIG. 2, there is seen an example of a mold gating system which can be used in the practice of the invention. In this case, one or more articles 10 have been cut to a desired length and shape to form portions of a gating system 12 for a mold. Gating system 12 provides a series of conduits for introduction of molten metal into one or more mold cavities 13A and 13B, etc. located within mold 14. While the gating system 12 is shown to terminate in the shape of a funnel type contour 16 at the top surface 15 of mold 14, it will be understood that the down sprue 12 can be extended further upwardly above the top of surface 15. Preferably each mold cavity 13 can be connected to a riser 17 which also may be provided with ceramic linings 18 of this invention.

A great variety of shapes can be formed in accordance with the invention, for example, pipes, funnels, "T's", etc. FIG. 1 shows a pipe 10 having a main body portion with straight cylindrical walls 20 and an enlarged end 22. Two such pipes can then be joined using ends 22 as a female connector for the opposite end of another pipe. Shapes having a cross section other than cylindrical, such square, etc. can also be formed. Flat articles such as gating tiles, furnace linings, etc. can also be formed. Furnace linings can be installed and then cured in situ using radiant heat supplied by the furnace itself.

The ceramic shapes provided and used in the practice of the invention preferably contain no more than about 1.5 percent by weight of organic constituents. The process of the invention involves providing an aqueous slurry of ceramic materials. The amount of water added is adjusted to provide a consistency which can readily be vacuum formed into the desired shape. In addition to cylindrical shapes, various other shapes, for example, cylinders having flanges on the ends thereof, conical shapes, pouring cups, ladles, ladle liners or shapes adapted to form furnace liners upon sintering. Other applicable applications include pouring basins, funnels, pouring troughs and burner blocks.

The process entails providing such a slurried mixture which contains inorganic fibers mixed with inorganic ceramic particles. In a preferred embodiment, the fibers include some fibers which can be softened at temperatures below approximately 2000° F. The preferred fibers of this type constitute mineral wool. High temperature resistant fibers such as aluminosilicate fibers are also preferably included.

The particulate ceramic material includes particles preferably having a mesh size of approximately 80 to 500 mesh. The most preferred particles include a mixture zircon and alumina in an amount ranging from approximately 20 to 45 percent by weight of the composition. The combined weight of fibers should be about 10 to about 35 weight percent thereof. Additionally included is a binder preferably based on clay and colloidal silica which is provided in an amount of about 3 to about 10 percent by weight of the total composition. In the preferred composition a suspension-forming agent such as a hydrated aluminum magnesium silicate is included. This material assists in forming a good suspension of particles in the slurry. Also, less than 1.5 percent by weight of a flake-starch material assists in flocculation of the mixture and also provides a low-temperature binding effect. These materials thus serve to provide green strength to the shape particularly immediately after vacuum formation.

Alumina is a preferred material which provides particle to the mixture that will sinter. Stabilized zirconia will also sinter, to some degree at more elevated temperatures. It will be understood, also that other inorganic materials can be added to the mixture as stable, heat-resistant fillers. Examples of such materials include zirconia, zircon ($ZrO_2.SiO_2$) silicon carbide, magnesite, mullite, kaolin, bauxite, etc. can be added. It is preferred to use calcined alumina.

EXAMPLES

In the following examples of embodiments of the invention, all parts are given by weight unless otherwise noted.

Example 1

| Materials | Weight Percent |
| --- | --- |
| Mineral Wool Fiber | 17.505 |
| High Temperature Fiber | 17.505 |
| Alumina (calcined) | 28.88 |
| Zircon | 28.88 |
| Hydrated Alumina Magnesium Silicate | 0.87 |
| Colloidal Silica | 2.63 |
| Tennessee Clay | 2.63 |
| Flake Starch | 1.09 |

Water is added as needed to form a workable slurry. After vacuum formation in accordance with conventional procedures, the resultant shapes are baked at about 400° F. to form stable ceramic shapes. The dried shapes were dipped in a colloidal silica suspension and rebaked at about 400° F. until dry. The resultant shapes are readily cut with a hand saw or similar cutting tool. When cut and placed in a mold gating system, the shapes were sintered and converted into hardened, non-compressible materials by being directly contacted by molten metal. The shapes also sinter when subjected to radiant heat.

Example 2

The following materials were slurried and processed in accordance with the procedure described in Example 1:

| Materials | Weight Percent |
| --- | --- |
| Mineral Wool Fiber | 35.010 |
| Alumina (calcined) | 28.88 |
| Zircon | 28.88 |
| Hydrated Alumina Magnesium Silicate | 0.87 |
| Colloidal Silica | 2.63 |
| Tennessee Clay | 2.63 |
| Flake Starch | 1.09 |

Results similar to those reported with regard to those of Example 1 were obtained.

Example 3

The following materials were slurried and processed in accordance with the procedure described in Example 1:

| Materials | Weight Percent |
| --- | --- |
| Mineral Wool Fiber | 17.505 |
| High Temperature Fiber | 17.505 |
| Alumina (calcined) | 57.76 |
| Hydrated Alumina Magnesium Silicate | .87 |
| Colloidal Silica | 2.63 |
| Tennessee Clay | 2.63 |
| Flake Starch | 1.09 |

Results similar to those reported with regard to those of Example 1 were obtained.

Example 4

The following materials were slurried and processed in accordance with the procedure described in Example 1:

| Materials | Weight Percent |
| --- | --- |
| Mineral Wool Fiber | 17.505 |
| High Temperature Fiber | 17.505 |
| Alumina (calcined) | 28.88 |
| Zircore (zircon-silica mixture) | 28.88 |
| Hydrated Alumina Magnesium Silicate | .87 |
| Colloidal Silica | 2.63 |
| Tennessee Clay | 2.63 |
| Flake Starch | 1.09 |

Results similar to those reported with regard to those of Example 1 were obtained.

We claim:

1. A shaped ceramic article capable of being cut manually into selected sizes comprising
   inorganic fibers which soften at temperatures below 2000° F. and which comprise mineral wool fibers,
   particles of a ceramic material infusible to temperatures exceeding 2000° F.,
   at least 20 per cent by weight of particles of having a mesh size of about 80 to 500 mesh of a ceramic material which sinters at temperatures below 2000° F., and, a finely divided inorganic binder which provides green strength to said shape, said shape containing less than about 1.5 per cent organic constituents and being sinterable by contact with flowing molten metal or radiant heat into a hardened shape-stable form.

2. An article according to claim 1 wherein said particles which sinter comprise alumina.

3. An article according to claim 1 wherein said binder comprises colloidal silica or colloidal alumina and a clay.

4. An article according to claim 1 wherein said temperature-stable ceramic particles comprise $ZrO_2 \cdot SiO_2$.

5. An article according to claim 1 wherein the total amount of ceramic particles comprises approximately 20 to 45 percent, the combined amount of said fibers comprise about 10 to about 35 weight percent, and said binder comprises about 3 to 10 percent by weight, the remainder of said composition comprising inert fillers.

* * * * *